(12) United States Patent
Malachowski et al.

(10) Patent No.: US 8,128,035 B2
(45) Date of Patent: Mar. 6, 2012

(54) WINGLETS WITH RECESSED SURFACES, AND ASSOCIATED SYSTEMS AND METHODS

(75) Inventors: Adam P. Malachowski, Lynnwood, WA (US); Stephen R. Chaney, Seattle, WA (US); Norman K. Ebner, Bellevue, WA (US); Stephen T. LeDoux, Everett, WA (US)

(73) Assignee: The Boeing Company, Chicago, IL (US)

( * ) Notice: Subject to any disclaimer, the term of this patent is extended or adjusted under 35 U.S.C. 154(b) by 657 days.

(21) Appl. No.: 12/103,430

(22) Filed: Apr. 15, 2008

(65) Prior Publication Data

US 2009/0256029 A1 Oct. 15, 2009

(51) Int. Cl.
*B64C 23/06* (2006.01)

(52) U.S. Cl. .................. 244/199.4; 244/200.1; 244/130

(58) Field of Classification Search .................. 244/130, 244/199.1, 199.2, 199.3, 199.4, 200, 200.1; D12/345

See application file for complete search history.

(56) References Cited

U.S. PATENT DOCUMENTS

| | | | |
|---|---|---|---|
| 1,354,677 A | 10/1920 | Mix | |
| 1,466,551 A | 8/1923 | Thurston | |
| 1,841,921 A | 1/1932 | Spiegel | |
| 1,888,418 A | 11/1932 | Adams | |
| 2,370,801 A | 3/1945 | Klose | |
| 2,576,981 A * | 12/1951 | Vogt | 244/91 |
| 2,743,888 A | 5/1956 | Lippisch | |
| 2,749,061 A | 6/1956 | Franz | |
| 2,750,134 A | 6/1956 | Hawkins et al. | |
| 3,018,985 A | 1/1962 | Voigt | |
| 3,027,118 A | 3/1962 | Willox | |
| 3,270,988 A | 9/1966 | Cone, Jr. | |
| 3,273,833 A | 9/1966 | Windecker | |
| 3,712,564 A | 1/1973 | Rethorst | |
| 3,840,199 A | 10/1974 | Tibbs | |
| 4,045,336 A | 8/1977 | Isteri et al. | |
| 4,046,336 A | 9/1977 | Tangler | |
| 4,108,403 A * | 8/1978 | Finch | 244/199.2 |
| 4,172,574 A | 10/1979 | Spillman | |
| 4,190,219 A | 2/1980 | Hackett | |
| 4,205,810 A | 6/1980 | Ishimitsu | |
| 4,382,569 A | 5/1983 | Boppe et al. | |

(Continued)

FOREIGN PATENT DOCUMENTS

DE 634884 7/1934

(Continued)

OTHER PUBLICATIONS

AERO 17; Wingtip Devices; http://www.boeing.com/commercial/aeromagazine/aero_17/wingtip_devices.html; accessed Jun. 1, 2007; 5 pgs.

(Continued)

*Primary Examiner* — Tien Dinh
*Assistant Examiner* — Michael Kreiner
(74) *Attorney, Agent, or Firm* — Perkins Coie LLP

(57) ABSTRACT

Winglets with recessed surfaces, and associated systems and methods are disclosed. A system in accordance with a particular embodiment includes a wing having an inboard portion and an outboard portion, and further includes a winglet coupled to the wing at the outboard portion. The winglet can have a first surface facing at least partially inboard and a second surface facing at least partially outboard, with the first surface including a recessed region.

23 Claims, 5 Drawing Sheets

U.S. PATENT DOCUMENTS

| | | | |
|---|---|---|---|
| 4,455,004 A | | 6/1984 | Whitaker |
| 4,457,479 A | | 7/1984 | Daude |
| 4,541,593 A | | 9/1985 | Cabrol |
| 4,545,552 A | | 10/1985 | Welles |
| 4,595,160 A | * | 6/1986 | Santos .................... 244/199.4 |
| 4,671,473 A | | 6/1987 | Goodson |
| 4,674,709 A | | 6/1987 | Welles |
| 4,700,911 A | | 10/1987 | Zimmer |
| 4,714,215 A | | 12/1987 | Jupp et al. |
| 4,722,499 A | | 2/1988 | Klug |
| 4,776,542 A | | 10/1988 | Van Dam |
| 4,915,324 A | | 4/1990 | Foreau |
| 5,039,032 A | | 8/1991 | Rudolph |
| 5,082,204 A | | 1/1992 | Croston |
| 5,102,068 A | | 4/1992 | Gratzer |
| 5,156,358 A | | 10/1992 | Gerhardt |
| 5,275,358 A | | 1/1994 | Goldhammer |
| 5,348,253 A | | 9/1994 | Gratzer |
| 5,378,524 A | * | 1/1995 | Blood ........................ 428/141 |
| 5,395,071 A | * | 3/1995 | Felix ........................ 244/35 R |
| 5,407,153 A | | 4/1995 | Kirk et al. |
| 5,435,504 A | | 7/1995 | Inoue |
| 5,634,613 A | | 6/1997 | McCarthy |
| 5,692,703 A | | 12/1997 | Murphy |
| 5,788,191 A | | 8/1998 | Wake et al. |
| 5,897,078 A | | 4/1999 | Burnham |
| 5,909,858 A | | 6/1999 | Hawley |
| 5,975,464 A | | 11/1999 | Rutan |
| 5,992,793 A | | 11/1999 | Perry et al. |
| 6,089,502 A | | 7/2000 | Herrick et al. |
| 6,161,797 A | | 12/2000 | Kirk et al. |
| 6,237,873 B1 | | 5/2001 | Amaoka et al. |
| 6,345,790 B1 | | 2/2002 | Brix |
| 6,474,604 B1 | * | 11/2002 | Carlow ........................ 244/198 |
| 6,484,968 B2 | | 11/2002 | Felker |
| 6,547,181 B1 | | 4/2003 | Hoisington |
| 6,578,798 B1 | | 6/2003 | Dizdarevic et al. |
| 6,726,149 B2 | | 4/2004 | Wojciechowski |
| 6,827,314 B2 | | 12/2004 | Barriety et al. |
| 6,886,778 B2 | | 5/2005 | McLean |
| 6,929,219 B2 | | 8/2005 | Wojciechowski |
| 7,048,228 B2 | | 5/2006 | Vassberg et al. |
| 7,275,722 B2 | | 10/2007 | Irving et al. |
| 2004/0135032 A1 | | 7/2004 | Gregg et al. |
| 2004/0155146 A1 | | 8/2004 | Wyrembek et al. |
| 2005/0184196 A1 | | 8/2005 | Shmilovich et al. |
| 2006/0027703 A1 | | 2/2006 | Bussom et al. |
| 2007/0018049 A1 | | 1/2007 | Stuhr |
| 2008/0191099 A1 | | 8/2008 | Werthmann et al. |
| 2009/0039204 A1 | | 2/2009 | Eberhardt |
| 2009/0084904 A1 | | 4/2009 | Detert |
| 2009/0224107 A1 | | 9/2009 | McLean |

FOREIGN PATENT DOCUMENTS

| | | |
|---|---|---|
| DE | 2149956 A1 | 4/1973 |
| DE | 19926832 A1 | 1/2001 |
| EP | 0 094 064 A | 11/1983 |
| EP | 0113466 A1 | 7/1984 |
| EP | 1493660 A1 | 1/2005 |
| FR | 2780700 | 1/2000 |

OTHER PUBLICATIONS

Design and Analysis of Winglets for Military Aircraft, Technical Report AFFDL-TR-76-3, Feb. 1976 (p. 88-143).

Whitcomb, Richard T, NASA Technical Note, NASA TN D-8260, "A Design Approach and Selected Wind-Tunnel Results at High Subsonic Speeds for Wing-Tip Mounted Winglets," National Aeronautics and Space Administration, Washington, D.C., Jul. 1976 (33 pages).

Wilcox et al., "Simultaneous Optimization of a Multiple-Aircraft Family", Journal of Aircraft, Jul. 2003, pp. 616-622.

Wing Design Parameters (4 pages); http://www.desktopaero.com/appliedaero/wingdesign/wingparams.html; [Accessed Jun. 12, 2003].

Cone, "The Theory of Induced Lift and Minimum Induced Drag of Non-Planar Lifting Systems," NASA Technical Report R-139 National Aeronautics and Space Administration, Issued Aug. 16, 1963, 35 pages.

Craig et al., "Spanload Optimization for Strength Designed Lifting Surfaces," AIAA 6th Applied Aerodynamics Conference, The Boeing Company, Jul. 6-8, 1988, 8 pages.

International Search Report and Written Opinion, International Application No. PCT/US2009/037868, Applicant: The Boeing Company, mailed Aug. 12, 2009, 15 pages.

Kroo, I., "NonPlanar Wing Concepts for Increased Aircraft Efficiency," VKI lecture series on Innovative Configurations and Advanced Concepts for Future Civil Aircraft, Jun. 6-10, 2005, 29 pages.

La Roche et al., "Wing-Grid, a Novel Device for Reduction of Induced Drag on Wings," La Roche Consulting presented at ICAS 96 in Sorrento, Italy, 7 pages.

McLean, Doug "Wingtip Devices: What They Do and How They Do It," Boeing Aerodynamics, Article 4, presented 2005 Boeing Performance and Flight Operations Engineering Conference, 20 pages.

Pfenninger et al., "About the Design Philosphy of Long Range LFC Transports with Advanced Supercritical LFC Airfoils," AIAA 19th Fluid Dynamics, Plasma Dynamics and Laser Conference, AIAA 87, Jun. 8-10, 1987, 66 pages.

Flechner et al., "Experimental Results of Winglets on First, Second, and Third Generation Jet Transports," NASA Technical Memorandum 72674, May 1978, 21 pages.

Hackett, J.E., Vortex Drag Reduction by AFT-Mounted Diffusing Vanes, ICAS Paper 80-13.4, 1980, pp. 542-553.

* cited by examiner

WINGLETS WITH RECESSED SURFACES, AND ASSOCIATED SYSTEMS AND METHODS

TECHNICAL FIELD

The following disclosure relates generally to winglets with recessed surfaces, and associated systems and methods.

BACKGROUND

The idea of using winglets to reduce induced drag on aircraft wings was studied by Richard Whitcomb of NASA and others in the 1970s. Since then, a number of variations on this idea have been patented (see, for example, U.S. Pat. No. 4,205,810 to Ishimitsu and U.S. Pat. No. 5,275,358 to Goldhammer, et al.). In addition, a number of tip device variations are currently in service. Such devices include horizontal span extensions and aft-swept span extensions that are canted upward or downward at various angles. These devices can be added to a new wing during the initial design phase of an all-new aircraft, or they can be added to an existing wing as a retrofit or during development of a derivative model.

The induced drag of a wing or a wing/winglet combination can be calculated with reasonable accuracy using the classic "Trefftz plane theory." According to this theory, the induced drag of an aircraft wing depends only on the trailing edge trace of the "lifting system" (i.e., the wing plus tip device), as viewed directly from the front or rear of the wing, and the "spanload." The spanload is the distribution of aerodynamic load perpendicular to the trailing edge trace of the wing. Aerodynamicists often refer to this aerodynamic load distribution as "lift," even though the load is not vertical when the trailing edge trace is tilted from horizontal. Adding a winglet or other wing tip device to a wing changes both the trailing edge trace (i.e., the "Trefftz-plane geometry") and the spanload. As a result, adding such a device also changes the induced drag on the wing.

For a given Trefftz-plane geometry and a given total vertical lift, there is generally one spanload that gives the lowest possible induced drag. This is the "ideal spanload," and the induced drag that results from the ideal spanload is the "ideal induced drag." For a flat wing where the Trefftz-plane geometry is a horizontal line, the ideal spanload is elliptical. Conventional aircraft wings without winglets are close enough to being flat in the Trefftz-plane that their ideal spanloads are very close to elliptical. For conventional aircraft wings having vertical or near-vertical winglets (i.e., nonplanar lifting systems), the ideal spanload is generally not elliptical, but the ideal spanload can be easily calculated from conventional wing theory.

Conventional aircraft wings are generally not designed with ideal or elliptical spanloads. Instead, they are designed with compromised "triangular" spanloads that reduce structural bending loads on the wing. Such designs trade a slight increase in induced drag for a reduction in airframe weight. The degree of compromise varies considerably from one aircraft model to another. To produce such a triangular spanload, the wing tip is typically twisted to produce "washout." Washout refers to a wing that twists in an outboard direction so that the trailing edge moves upward relative to the leading edge. Washing out the wing tip in this manner lowers the angle of attack of the wing tip with respect to the wing root, thereby reducing the lift distribution toward the wing tip.

Designing a new wing and developing the associated tooling for a new wing is an expensive undertaking. Accordingly, some aircraft manufacturers develop derivative wing designs that are based at least in part on an initial design. While such designs can be less expensive to develop, they typically include at least some performance compromises. Accordingly, there remains a need for improved, cost-effective wing development processes.

SUMMARY

The present disclosure is directed generally to winglets with recessed surfaces, and associated systems and methods. A system in accordance with a particular embodiment includes a wing having an inboard portion and an outboard portion, and a winglet coupled to the wing at the outboard portion. The winglet has a first surface facing at least partially inboard and a second surface facing at least partially outboard, with the first surface including a recessed region. The recessed region can be concave relative to adjacent regions of the first surface, and the adjacent regions can include regions located on both sides of the recessed region in a chordwise direction, and a region positioned away from the wing along the spanwise axis of the winglet.

Other aspects of the disclosure are directed to methods for designing an aircraft system. One such method includes providing a design for a wing that includes airfoil sections from an inboard region to an outboard region of the wing. The method further includes designing a winglet for use with the wing without changing the general shapes of the wing airfoil sections. The winglet has a first surface facing generally inboard and a second surface facing generally outboard away from the first surface. Designing the winglet includes at least reducing a performance impact of flow at a junction region of the wing and the winglet by designing a concave recess in the first surface of the winglet.

DETAILED DESCRIPTION

The following disclosure describes winglets with recessed surfaces, and associated systems and methods. Certain specific details are set forth in the following description and in FIGS. 1-8 to provide a thorough understanding of various embodiments of the disclosure. Other details describing well-known structures and systems often associated with aircraft and aircraft wings are not set forth in the following description to avoid unnecessarily obscuring the description of the various embodiments.

Many of the details, dimensions, angles and other specifications shown in the Figures are merely illustrative of particular embodiments. Accordingly, other embodiments can have other details, dimensions, and specifications without departing from the present disclosure. In addition, other embodiments may be practiced without several of the details described below.

Figure 1:
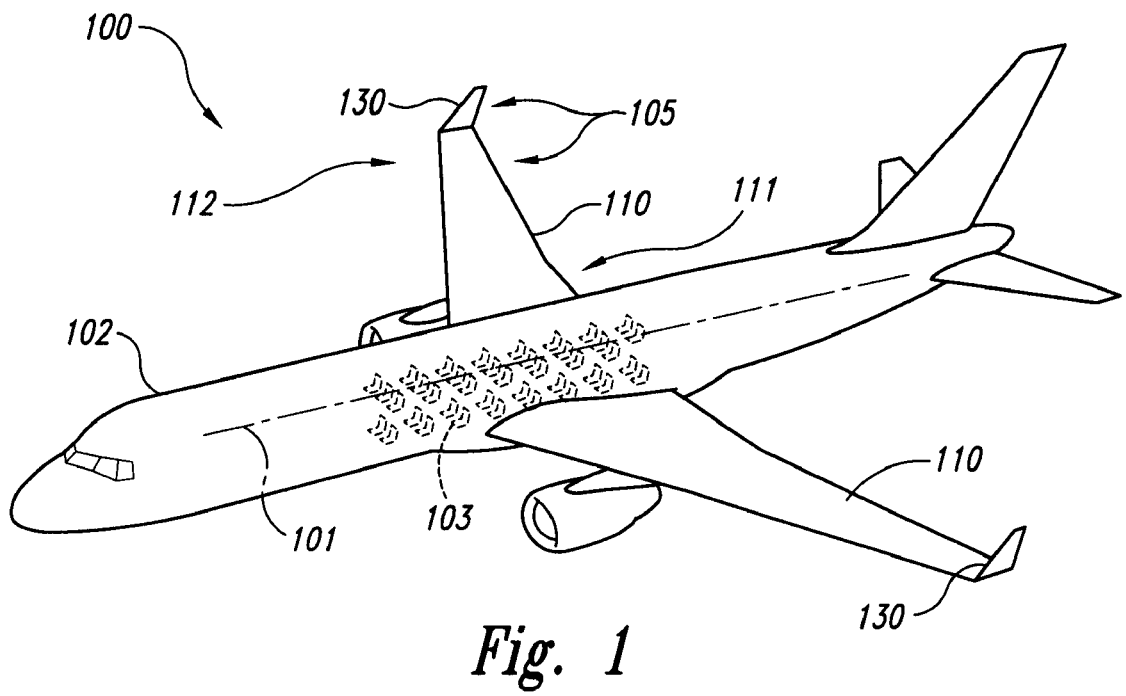
FIG. 1 is a partially schematic, isometric illustration of an aircraft having wings and wingtip devices configured in accordance with an embodiment of the disclosure.

FIG. 1 is a top isometric view of an aircraft 100 having a wing/winglet combination 105 configured in accordance with an embodiment of the disclosure. In one aspect of this embodiment, the aircraft 100 includes a lifting surface such as a wing 110 extending outwardly from a fuselage 102. The fuselage 102 can be aligned along a longitudinal axis 101 and can include a passenger compartment 103 configured to carry a plurality of passengers (not shown). In one embodiment, the passenger compartment 103 can be configured to carry at least 50 passengers. In another embodiment, the passenger compartment 103 can be configured to carry at least 150 passengers. In further embodiments, the passenger compartment 103 can be configured to carry other numbers of passengers, and in still other embodiments (such as military embodiments), the passenger compartment 103 can be omitted or can be configured to carry cargo.

The wing 110 has an inboard portion 111 that includes the wing root, and an outboard portion 112 that includes the wing tip. The wing 110 also includes a winglet 130. In some cases, the winglet 130 can be added to an existing wing design, and in other cases, the wing 110 and the winglet 130 can be designed together. In either case, the winglets 130 can be particularly selected and/or configured to account for constraints associated with the design of the wing 110.

Although the winglet 130 of the illustrated embodiment is combined with a wing, in other embodiments, the winglet 130 can be combined with other types of lifting surfaces to reduce aerodynamic drag and/or serve other purposes. For example, in one other embodiment, the winglet 130 can be combined with a forward-wing or canard to reduce the aerodynamic drag on the canard. In further embodiments, the winglet 130 can be combined with other lifting surfaces. In particular embodiments, the winglets can be vertical, while in other embodiments, the winglets can be canted from the vertical. Embodiments in which the winglets are vertical or at least canted upwardly from the horizontal can be particularly useful for reducing space occupied by the aircraft 100 at an airport gate.

Figure 2:
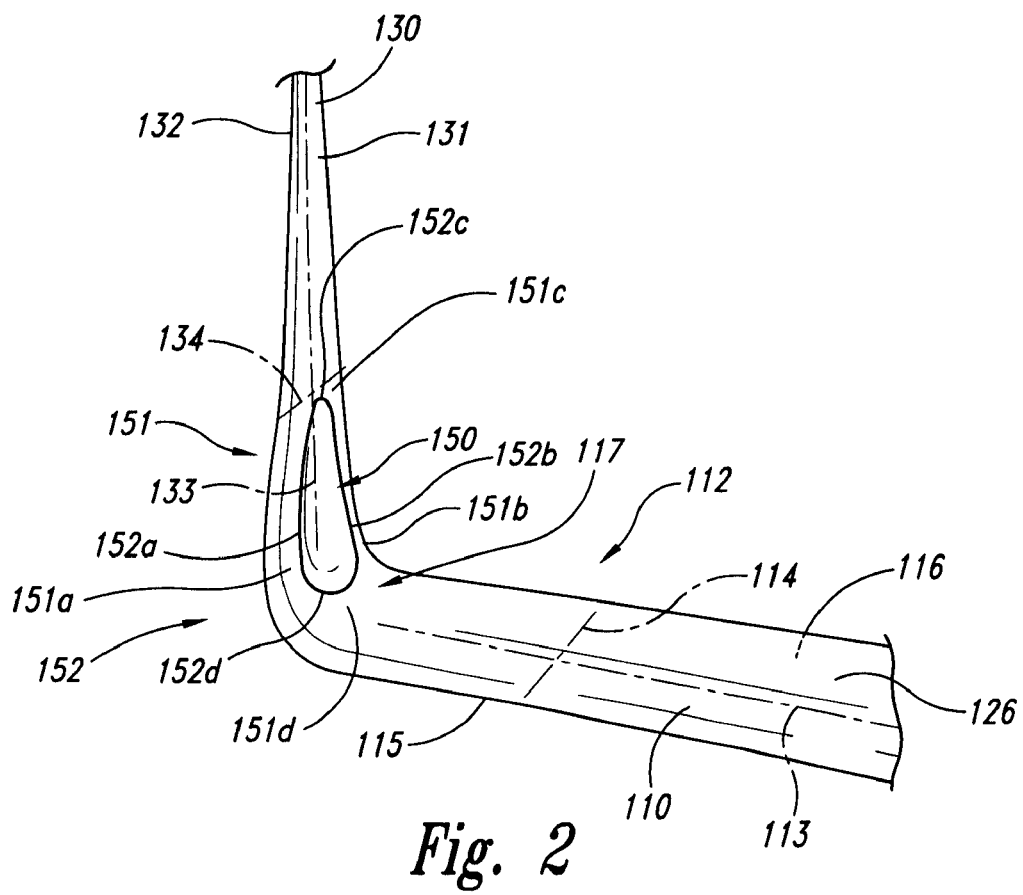
FIG. 2 is a partially schematic, isometric illustration of an outboard wing portion and winglet having a recessed region in accordance with a particular embodiment of the disclosure.

FIG. 2 is a partially schematic, isometric view (looking generally aft and slightly outboard) of an outboard portion 112 of the wing 110, along with the winglet 130. The wing 110 includes an upper surface 126 and extends outboard along a wing spanwise axis 113, and extends fore and aft along a wing chordwise axis 114 between a wing leading edge 115 and a wing trailing edge 116. At the outboard portion 112, the wing 110 includes a wing/winglet junction 117 at which the wing 110 transitions to the winglet 130. In a particular embodiment, the junction 117 can be generally curved and/or gradual to reduce flow interference between the wing 110 and the winglet 130. In other embodiments, the junction 117 can have other shapes and/or configurations, including a sharp corner and/or a tight radius corner. As used herein, the term sharp corner refers to a corner that includes a surface discontinuity and/or sudden change in shape, e.g., a non-gradual change in slope. In any of these embodiments, the winglet 130 includes a first (e.g., inboard-facing) surface 131 and a second (e.g., outboard-facing) surface 132. The winglet 130 extends away from the wing 110 along a winglet spanwise axis 133, and extends fore and aft along a winglet chordwise axis 134.

The winglet 130 can further include a recessed region 150 located in the first surface 131. The recessed region 150 can be particularly sized and located to account for (e.g., reduce or eliminate) possible interference effects between the wing 110 and the winglet 130 in the region of the wing/winglet junction 117. In a particular embodiment, the recessed region 150 is bounded by adjacent regions 151 that are not recessed. Such adjacent regions 151 can include a forward adjacent region 151a, an aft adjacent region 151b, an upper or distal adjacent region 151c and a lower or proximal adjacent region 151d. The adjacent regions 151 can be convex, in contrast to the concave recessed region 150.

In a particular embodiment shown in FIG. 2, the recessed region 150 is generally pear-shaped. Accordingly, the chordwise extent of the recessed region 150 can decrease in an upward/outward direction along the winglet spanwise axis 133. The illustrated recessed region 150 is roughly bounded by four points 152, including a forward-most point 152a, an aft-most point 152b, an uppermost or distal point 152c, and a lowermost or proximal point 152d. In other embodiments, the recessed region 150 can have other shapes and/or boundaries.

In a representative embodiment, the location of the forward-most point 152a can range from about 20% to about 40% of the local chordlength of the winglet 130, and the location of the aft-most point 152b can range from about 45% to about 65% of the local chordlength. In a particular embodiment, the recessed region extends from about 25% of the local chordlength to about 65% of the local chordlength over its spanwise extent. The location of the uppermost point 152c can range from about 20% to about 40% (e.g., about 30%) of the spanwise dimension of the winglet 130, and the location of the lower-most point 152d can range from about 0% to about 20% of the spanwise dimension of the winglet. These locations can have other values and other embodiments, depending upon the particular installation, the orientation of the winglet 130 relative to the wing 110, and/or other design and/or operation features.

Figure 3:
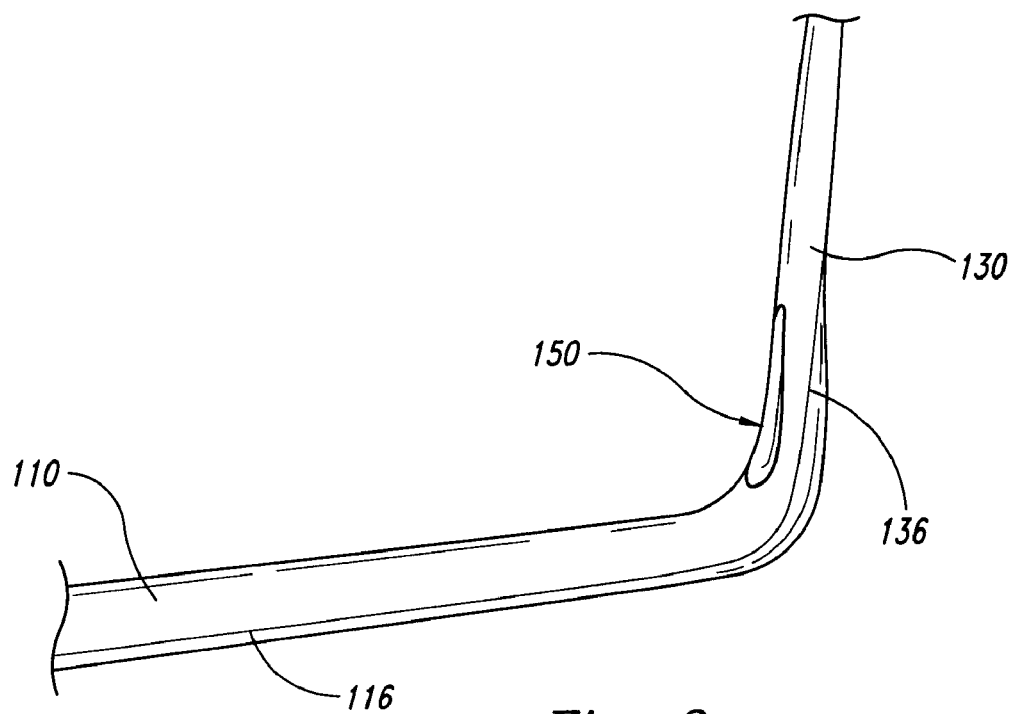
FIG. 3 is a rear view (looking forward) of a portion of the wing and winglet shown in FIG. 2.

FIG. 3 is a rear view (looking forward) of a portion of the wing 110 and the winglet 130 shown in FIG. 2. FIG. 3 accordingly illustrates the recessed region 150 from the rear, indicating the overall shape of the recessed region 150 and its location relative to both the winglet 130 (including the winglet trailing edge 136) and the wing 110.

Figure 4:
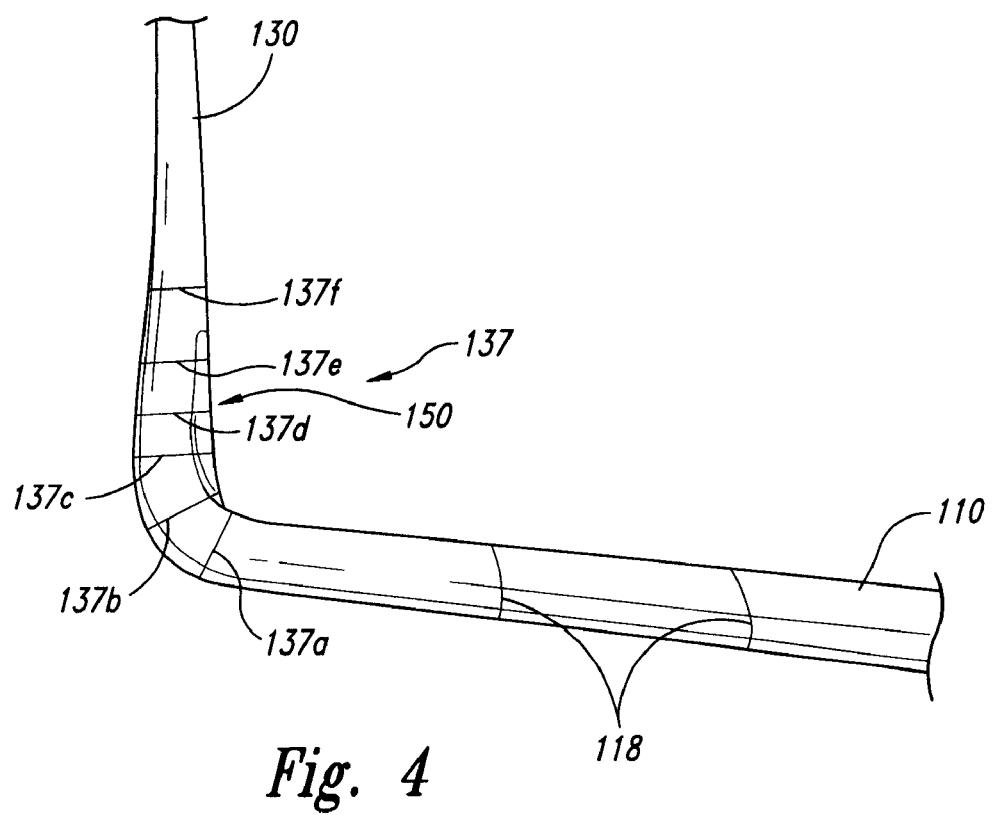
FIG. 4 is a front view (looking rearward) of a portion of the wing and winglet shown in FIG. 2, with particular winglet sections identified.
Figure 5F:
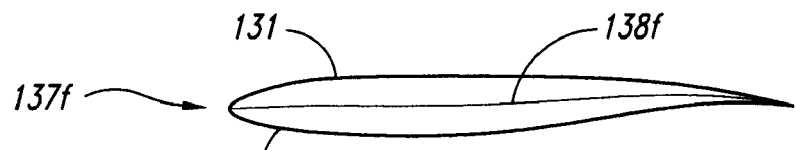
FIGS. 5A-5F are nondimensionalized, cross-sectional illustrations of the winglet sections identified in FIG. 4.
Figure 5E:
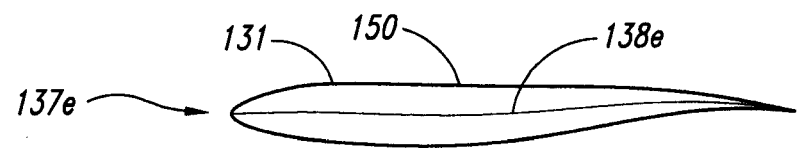
Figure 5D:
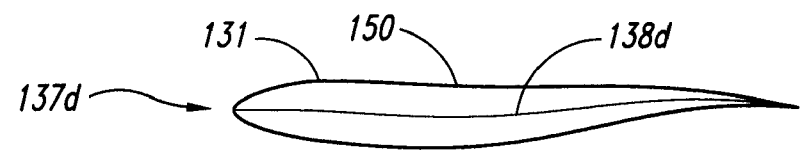
Figure 5C:
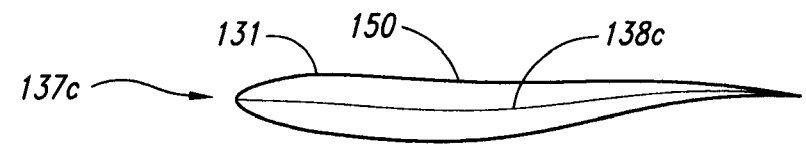
Figure 5B:
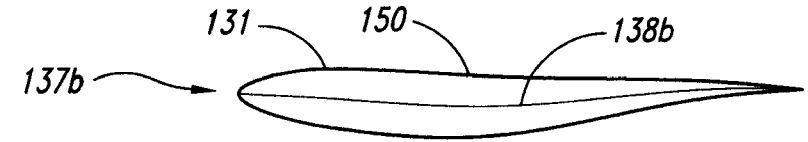
Figure 5A:
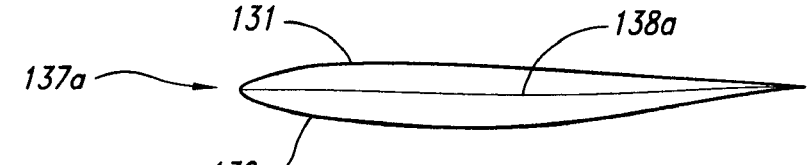

FIG. 4 is a front view (looking rearward) of the wing 110 and the winglet 130 shown in FIGS. 2 and 3, indicating representative wing sections 118, and representative winglet sections 137 (shown as first-sixth winglet sections 137a-137f). The first winglet section 137a is taken at a region positioned downward/inboard from the recessed region 150, and the sixth winglet section 137f is taken at a location that is above/outboard of the recessed region 150. The intermediate winglet sections 137b-137e intersect the recessed region 150 and are described in further detail below with reference to FIGS. 5A-7.

FIGS. 5A-5F illustrate the winglet chord sections 137a-137f, respectively, described initially above with reference to FIG. 4. The leading edge portions of the winglet chord sections 137a-137f are illustrated with a representative contour that may be different in different embodiments. As is also illustrated in FIGS. 5A-5F, each winglet chord section 137a-137f includes a camber line 138, illustrated as corresponding first-sixth camber lines 138a-138f. As is evident from FIGS. 5A-5F, the camber distribution for each chordwise section is non-monotonic, and the chordwise camber distribution varies in a non-monotonic manner along the spanwise axis of the winglet 130 in the recessed region 150. In particular, the camber line is generally flat below/inboard of the recessed region 150 (see camber line 138a), becomes concave or more concave in the recessed region 150 (see camber lines 138b-138e), and then becomes generally flat or less concave at a distal spanwise location above/outboard of the recessed region 150 (see camber line 138f). The first surface 131 of the winglet 130 has a similar, non-monotonic variation as the sections progress in a distal direction along the spanwise axis. Accordingly, as used herein, the term non-monotonic is used to describe a variation that changes in sense or direction, e.g., a contour that initially becomes more concave and then becomes less concave.

Figure 6:
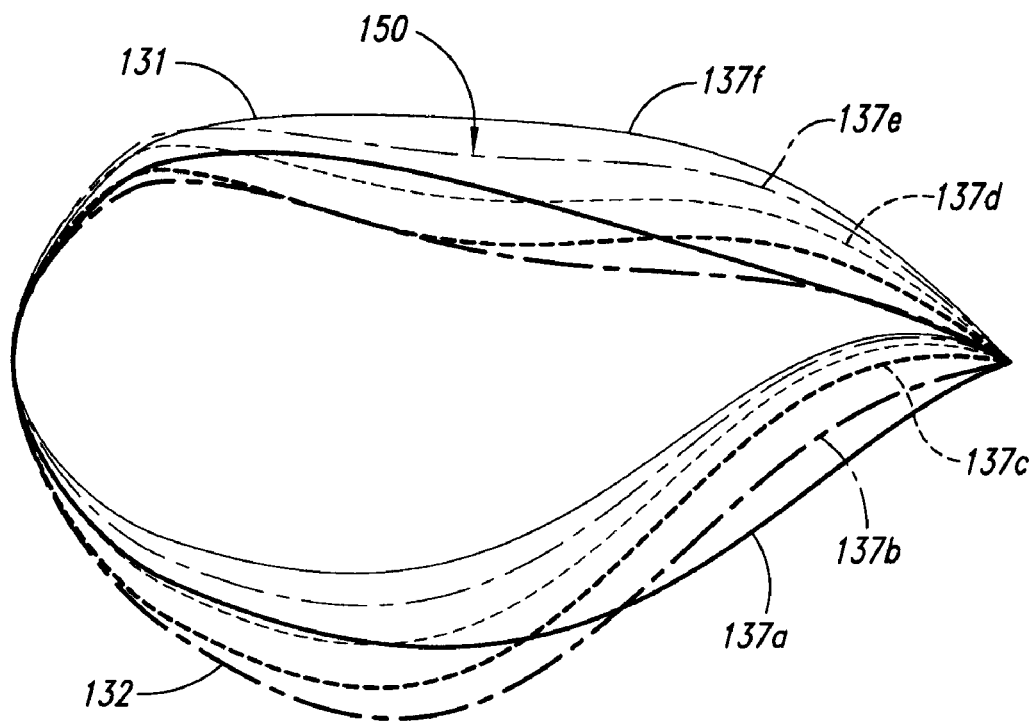
FIG. 6 is a composite of the winglet sections shown in FIGS. 5A-5F, with the vertical scale exaggerated for purposes of illustration.
Figure 7:
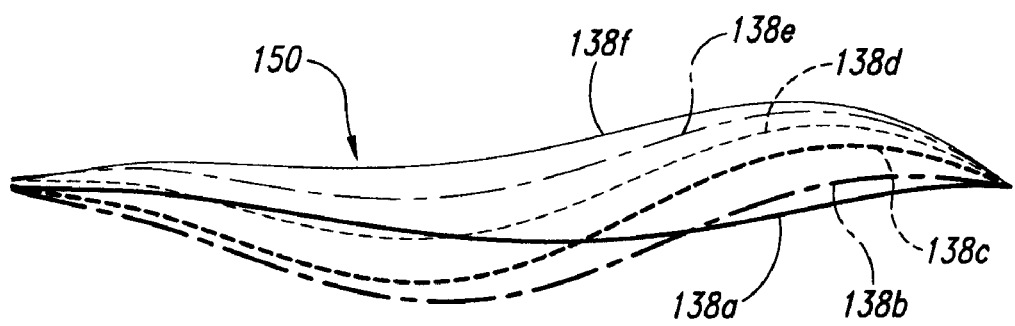
FIG. 7 is a composite of the winglet camber lines shown in FIGS. 5A-5F, with the vertical scale exaggerated for purposes of illustration.

FIG. 6 illustrates the six winglet sections 137a-137f together, with the vertical scale exaggerated to highlight the presence of the recessed region 150. FIG. 7 illustrates the six camber lines 138a-138f together to indicate the variation of the camber lines in the recessed region. FIG. 6 illustrates the non-monotonic change in shape of the winglet first surface 131 in the recessed region 150 (see chord sections 137a-137f), and FIG. 7 illustrates the corresponding non-monotonic change in shape of the camber lines 138a-138f in the recessed region 150.

Returning briefly to FIG. 2, one expected advantage of embodiments of the winglet 130 that include the recessed region 150 is that the recessed region 150 can reduce or eliminate flow interference effects caused by the juxtaposition of the winglet 130 and the wing 110. In particular, without the recessed region 150, separated flow may develop at the wing/winglet junction 117, which can increase drag and/or reduce lift and in either case, can adversely affect aircraft performance. The recess 150 can also reduce or eliminate the likelihood for a "double-shock" pressure field in this region. In particular, the recess 150 can reduce the aerodynamic compression in the junction region 117 to reduce or eliminate such a shock pattern. This, in turn, can reduce the drag of the aircraft 100 (FIG. 1) and can improve the high-speed buffet margin of the wing 110, when compared with a wing that includes a winglet without such a feature. In general, it is expected that the tighter the corner of the wing/winglet junction 117, the greater the potential benefit of the recessed region 150. Accordingly, the recessed region 150 can have particular benefit when incorporated into a winglet 130 that is added to an existing wing to reduce drag, but, due to constraints on the spanwise extent of the modified wing, benefits from or requires a wing/winglet junction 117 with a tight or sharp corner.

Another particular advantage of the foregoing arrangement is that the recessed region 150 can be applied to the winglet 130 without affecting the wing upper surface 126. In particular, the wing upper surface 126 need not include a flat region or a concave or recessed region to provide the foregoing aerodynamic advantages, because it is expected that the recess 150 in the winglet 130 will be at least adequate to do so. Accordingly, an advantage of this arrangement is that the winglet 130 can be retrofitted to an existing and/or aerodynamically optimized wing 110.

Figure 8:
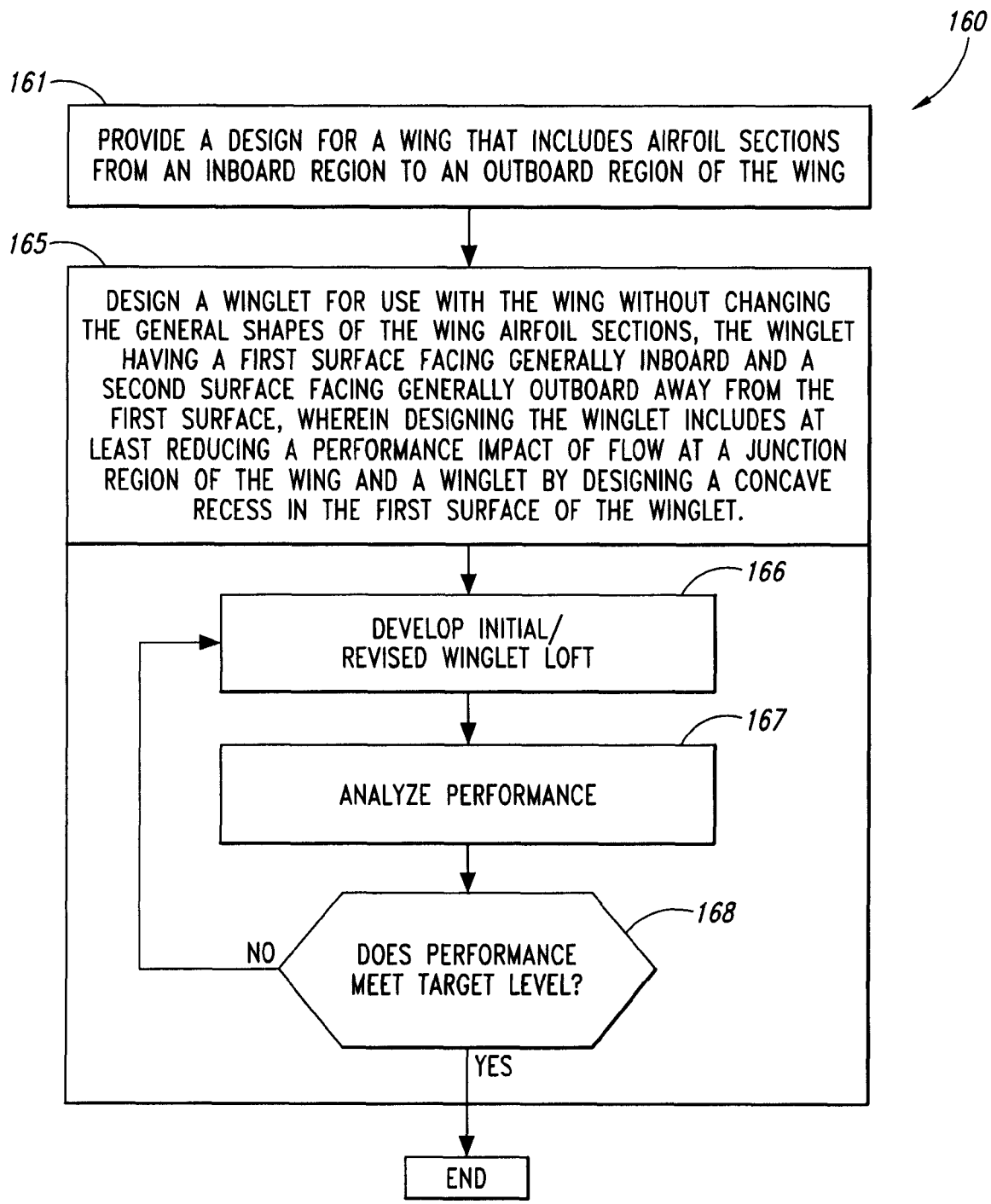
FIG. 8 is a flow diagram illustrating a method in accordance with a particular embodiment of the disclosure.

FIG. 8 illustrates a representative process 160 for designing a winglet. The process 160 includes providing a design for a wing that includes airfoil sections (e.g., the wing sections 118 shown in FIG. 4) extending from an inboard region to an outboard region of the wing (process portion 161). The method further includes designing a winglet for use with the wing, without changing the general shapes of the wing airfoil sections (process portion 165). The winglet can have a first surface facing generally inboard and a second surface facing generally outboard away from the first surface. Designing the winglet further includes at least reducing a performance impact of flow at a junction region of the wing and the winglet by designing a concave recess in the first surface of the winglet. The concave recess can be defined by a variety of methods, e.g., by altering the lines of an existing airfoil section in the recessed region, and/or by altering the lines of an existing airfoil section outside the recessed region (e.g., by "building up" regions outside the recessed region).

In particular embodiments, the process for developing the winglet contours can be iterative, and can include developing an initial winglet loft (process portion 166) and analyzing the performance of the loft (process portion 167). In process portion 168, the loft can be analyzed to determine whether it meets target performance levels. For example, the loft can be assessed using computational fluid dynamics (CFD) tools and/or wind tunnel testing to determine whether preselected target performance levels are met. If not, the initially developed loft can be revised (process portion 166) until performance levels are met, at which point the process can end.

From the foregoing, it will be appreciated that specific embodiments of the disclosure have been described herein for purposes of illustration, but that various modifications may be made in other embodiments. For example, the winglets can have different cant angles, different spanwise and/or chordwise extents and/or different configurations than are specifically identified in the Figures. Such configurations can include winglets that extend both above and below the wing, and/or spiroid winglets, and/or wingtip feathers. The recessed regions may also have different locations and/or extents depending upon the particular installation. Certain aspects of the disclosure described in the context of particular embodiments may be combined or eliminated in other embodiments. Further, while advantages associated with certain embodiments have been described in the context of those embodiments, other embodiments may also exhibit such advantages, and not all embodiments need necessarily exhibit such advantages to fall within the scope of the disclosure. Accordingly, the disclosure can include other embodiments not specifically described or shown above.

We claim:

1. An aircraft system, comprising:
   a wing having an inboard portion and an outboard portion; and
   a winglet coupled to the wing at the outboard portion, the winglet having a leading edge, a trailing edge, a first surface facing at least partially inboard and a second surface facing at least partially outboard, the first surface including a recessed region, wherein the first surface of the winglet is convex near the leading edge, convex near the trailing edge and concave in a region between the leading and trailing edges.

2. The system of claim 1 wherein the recessed region is concave relative to adjacent regions of the first surface, the adjacent regions including regions located on both sides of the recessed region in a chordwise direction, and including a region positioned away from the wing in a spanwise direction.

3. The system of claim 1 wherein the recessed region has a forwardmost point and an aftmost point in a chordwise direction, the recessed region having a proximal point closest to the wing in a spanwise direction and a distal point furthest from the wing in the spanwise direction.

4. The system of claim 3 wherein the forwardmost point is located at between about 20% and about 40% of a chordlength of the winglet intersecting the forwardmost point.

5. The system of claim 3 wherein the aftmost point is located at between about 45% and about 65% of a chordlength of the winglet intersecting the aftmost point.

6. The system of claim 3 wherein the proximal point is located at between about 0% and about 20% of a spanwise dimension of the winglet.

7. The system of claim 3 wherein the distal point is located at between about 20% and about 40% of a spanwise dimension of the winglet.

8. The system of claim 1 wherein a chordwise extent of the recessed region first increases and then decreases in a spanwise direction away from the wing.

9. The system of claim 1 wherein a chordwise extent of the recessed region increases in a spanwise direction away from the wing.

10. The system of claim 1 wherein a chordwise extent of the recessed region decreases in a spanwise direction away from the wing.

11. The system of claim 1 wherein the wing has an upper surface with a continuously convex shape at the outboard region, and wherein the winglet has a recessed region that does not extend to the upper surface of the wing.

12. The system of claim 1 wherein a junction region between the wing and the winglet includes a generally continuously curved transition between the wing and the winglet.

13. The system of claim 1 wherein a junction region between the wing and the winglet includes a discontinuous transition between the wing and the winglet.

14. An aircraft system, comprising:
a wing having an inboard region, and outboard region, an upper surface and a lower surface, the upper surface having a continuously convex shape at the outboard region; and
a winglet connected to the wing at the outboard region, the winglet extending away from the wing along a winglet spanwise axis, the winglet having a first surface facing at least partially inboard and a second surface facing at least partially outboard and away from the first surface, wherein the first surface includes a recessed region that is concave relative to neighboring regions of the first surface, the neighboring regions including a first convex region positioned forward of the recessed region in a chordwise direction, a second convex region positioned aft of the recessed region in the chordwise direction, and a third region positioned away from the wing along the winglet spanwise axis, and wherein a chordwise extent of the recessed region decreases along the winglet spanwise axis in a direction away from the wing.

15. The system of claim 14 wherein the recessed region is at least generally pear-shaped, and wherein the recessed region extends from about 25% chord to about 65% chord, and wherein the recessed region extends spanwise to about 30% span.

16. A method for designing an aircraft system, comprising:
providing a design for a wing that includes airfoil sections from an inboard region to an outboard region of the wing; and
designing a winglet for use with the wing without changing the general shapes of the wing airfoil sections at the outboard region of the wing, the winglet having a leading edge, a trailing edge, and a first surface facing generally inboard and a second surface generally outboard away from the first surface, wherein designing the winglet includes at least reducing a performance impact of flow at a junction region of the wing and winglet by designing a concave recess in the first surface of the winglet, the concave recess being between first and second convex regions, the first convex region being between the concave recess and the leading edge, and the second convex region being between the concave recess and the trailing edge.

17. The method of claim 16, wherein designing a winglet includes designing a winglet having a concave recess with a forwardmost point and an aftmost point in a chordwise direction, the concave recess having a proximal point closest to the wing in a spanwise direction and a distal point furthest from the wing in the spanwise direction.

18. The method of claim 17, further comprising selecting the forwardmost point to be located at between about 20% and about 40% of a chordlength of the winglet intersecting the forwardmost point.

19. The method of claim 17, further comprising selecting the aftmost point to be located at between about 45% and about 65% of a chordlength of the winglet intersecting the aftmost point.

20. The method of claim 17, further comprising selecting the proximal point to be located at between about 0% and about 20% of a spanwise dimension of the winglet.

21. The method of claim 17, further comprising selecting the distal point to be located at between about 20% and about 40% of a spanwise dimension of the winglet.

22. The method of claim 16 wherein designing a concave recess includes designing a recess into an existing winglet loft.

23. The method of claim 16 wherein designing a concave recess includes designing built up regions of an existing winglet loft in a forward region and an aft region of the winglet to define a recess between the forward and aft regions.

* * * * *